Jan. 19, 1960

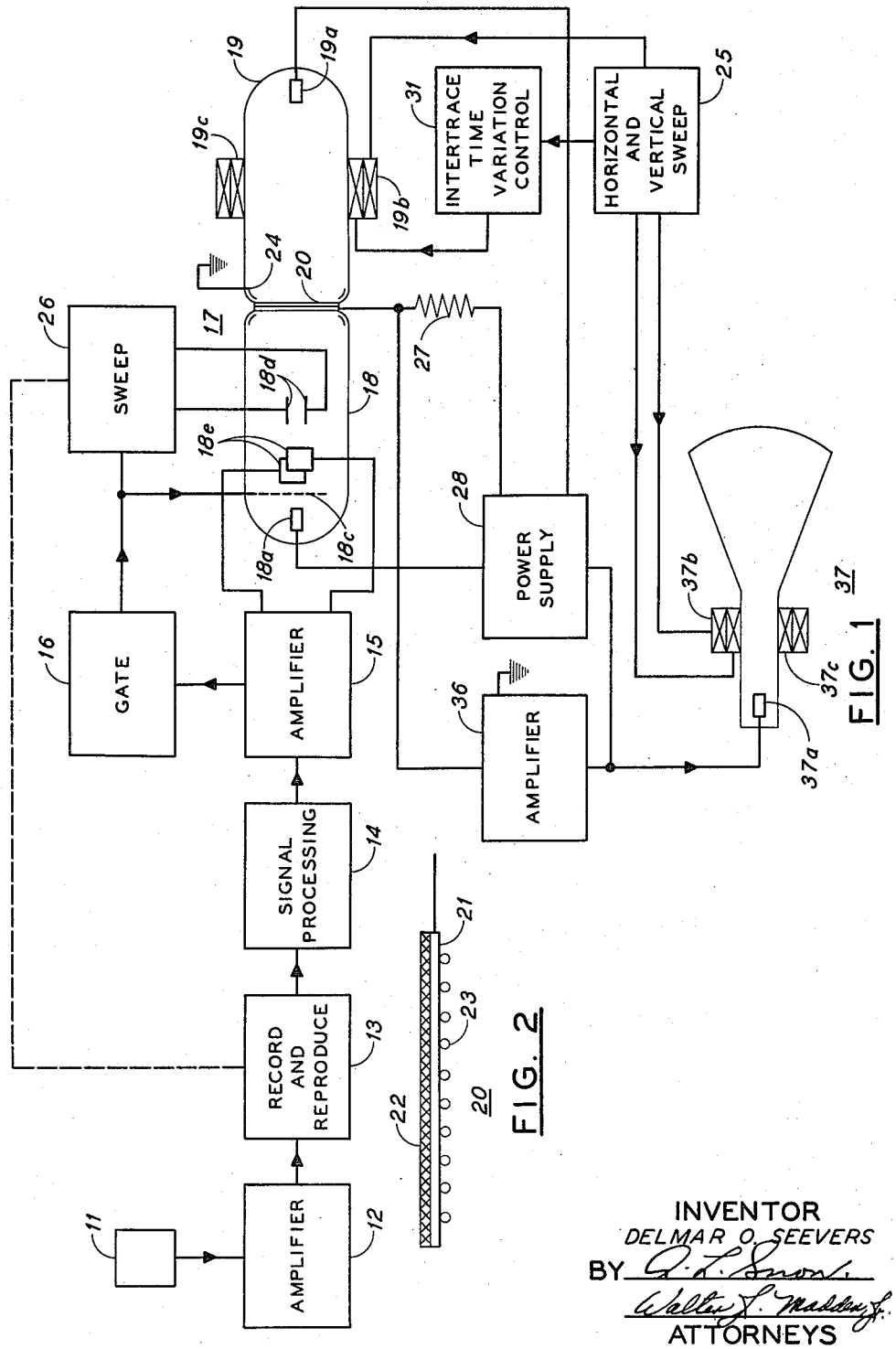

D. O. SEEVERS 2,922,070

SEISMIC SIGNAL ANALYSIS WITH CATHODE RAY STORAGE TUBE

Filed Aug. 24, 1954

INVENTOR
DELMAR O. SEEVERS
BY
ATTORNEYS

INVENTOR.
DELMAR O. SEEVERS
BY
ATTORNEYS

United States Patent Office 2,922,070
Patented Jan. 19, 1960

2,922,070

SEISMIC SIGNAL ANALYSIS WITH CATHODE RAY STORAGE TUBE

Delmar O. Seevers, Fullerton, Calif., assignor to California Research Corporation, San Francisco, Calif., a corporation of Delaware Application August 24, 1954, Serial No. 451,939

5 Claims. (Cl. 315—9)

The present invention relates in general to seismic prospecting and relates more particularly to methods of, and apparatus for, analyzing the seismic detector signals obtained in such prospecting.

In the art of seismic prospecting, the portion of the mechanical energy of artificially-generated seismic waves which returns to the earth's surface after reflection, refraction or diffraction by various subterranean formations is translated into electrical impulses by means of a plurality of seismic wave detectors, and these impulses are amplified and recorded for analysis. Since a number of controllable variables, such as filter settings, are involved in the recording of the signals, it is desirable that the seismic detector signals be reproducibly recorded in some form so that the signals may be subsequently reproduced repeatedly and at will to permit a study of the effect on the signals of changes in the different variables without necessitating the repetition of the seismic disturbance.

In analyzing the reproducibly recorded signals, the recorded signals are repeatedly reproduced, and one or more of the variables involved is modified during each reproduction. Among the variables which may be changed during such reproduction are filter settings, relative time shifts among the various signals representing the different detector outputs, and different combinations of mixing or combining of the different signals. The resultant modified signals may then be displayed on some type of oscilloscopic display medium to permit a rapid visual evaluation of the effect on the signals of the changes in the different variables.

In some of such systems, the different signals from the reproducible recording medium are sequentially reproduced, modified in a predetermined manner and supplied to an oscilloscope, resulting in a sequential tracing of the signals on the oscilloscope. However, this system has the disadvantages that, owing to the limited persistence of the oscilloscope phosphor, there is a considerable variation in brightness among the sequentially traced traces, particularly where there are considerable numbers of such traces to be displayed. This system results in a display in which the first trace is barely perceptible at the time of the tracing of the last trace, rendering accurate comparison of the events on the different traces difficult.

In another system, the different reproducibly-recorded traces are simultaneously reproduced and sequentially and progressively sampled to produce a series of pulses which are applied to the oscilloscope deflection means to trace out the signals in the form of a series of dots separated by intervals corresponding to the sampling intervals involved. If the sampling interval is small compared to the length of the dots, the series of dots will appear to the human eye as a continuous trace, with each of the different traces having substantially the same intensity or brightness.

However, this method has the disadvantage that since the period during which the seismic detector signals have magnitudes which are of interest is often less than the repetition period of the reproducible recording medium, corresponding to, say, the period of rotation of a magnetic drum, there is a portion of each repetition period of the reproducible recording medium during which no signal is supplied to the oscilloscopic display medium. This results in a considerable variation in the intensity of the brightness of the displayed traces during one repetition period of the reproducible recording medium, the traces appearing at normal intensity as they are traced out and then gradually becoming less intense during the portion of the period of the reproducible recording medium in which no information is reproduced and then brightening again as the reproducible recording medium starts its next period. This disadvantage is particularly undesirable at the times when it is desired to display only a portion of the complete seismic signals, since a correspondingly smaller portion of the complete period of the reproducible recording medium is utilized.

In accordance with the present invention, variations in a plurality of seismic detector signals are converted into corresponding variations in the charge distribution on an electrostatic, charge-modifiable storage surface. The variations in charge distribution on the surface are then detected at a rate substantially independent of the rate at which they are applied to the surface and converted into electrical signals corresponding to the seismic detector signals. In one form of the invention, the electron beam of a cathode ray tube is modulated in accordance with variations in the seismic detector signals, and the modulated electron beam is applied to the electrostatic, charge-modifiable surface to modify the charge thereon in accordance with variations in the signals. The charge-modified surface is then electrically scanned at a suitable rate to detect the charge modification produced thereon by the modulated electron beam. An electrical signal is developed which is proportional in amplitude to the charge modifications detected by the scanning, and this electrical signal may be oscilloscopically displayed to produce a visual record of the seismic detector signals.

The electron beam which is used to vary the charge distribution on the storage surface may be modulated either in intensity, by controlling the emission from the cathode ray gun as a function of the amplitude of the seismic detector signal, or in position, by controlling the deflection of the beam of electrons as a function of the amplitude of the seismic signal. By suitable choice of the characteristics of the charge-modifiable storage surface and its associated components, it is possible to utilize the storage device to perform a number of different operations on the seismic detector signals which may aid in obtaining additional information therefrom. For example, mixing or combining of separate detector signals may be accomplished on the charge-modifiable surface by causing the intensity-modulated electron writing beam to superpose successive signals on substantially the same portion of the surface, so that the resultant charge distribution is proportional to the sum of the applied seismic signals. Additionally, corrections among the different seismic detector signals for various inter-signal or intertrace time variations, such as those produced by normal moveout, stepout, irregular weathering, etc., may be made by controlling the scanning of the charge-modifiable surface in such a manner that effective time shifts are made among the various signals detected by the scanning, resulting in an oscilloscopic display of the signals in which the desired time corrections are present.

It is therefore an object of the present invention to provide improved methods and apparatus for analyzing seismic detector signals.

It is an additional object of this invention to provide a method for analyzing a plurality of seismic detector signals in which the charge distribution on an electrostatic, charge-modifiable surface is varied in accordance with variations in the seismic detector signals, and the charge modification so produced is converted into an electrical signal which may be oscilloscopically displayed.

It is a further object of the present invention to provide a method of displaying on an oscilloscopic medium a plurality of seismic detector signals which are recorded on a reproducible recording medium having a period of reproduction in excess of the period of persistence of the oscilloscope phosphor, in which method the charge distribution on an electrostatic, charge-modifiable surface is modified in accordance with variations in said signals and the charge modification so produced is converted into an oscilloscopic display signal having a period of repetition within the period of persistence of the oscilloscope phosphor.

It is an additional object of the present invention to provide methods and apparatus for displaying on an oscilloscopic medium a plurality of seismic detector signals in which variations in the seismic detector signals are translated into variations in the charge distribution on an electrostatic, charge-modifiable surface, the charge-modifiable surface is electrically scanned in a manner which varies the apparent time relationships of the signals detected by such scanning, and the detected signals are oscilloscopically displayed.

Objects and advantages other than those described above will be readily apparent from the following detailed description when read in conjunction with the accompanying drawing, in which:

Fig. 1 diagrammatically illustrates one embodiment of the present invention utilizing a device having a charge-modifiable surface to vary the apparent time relationships of the different seismic detector signals;

Fig. 2 is an enlarged view of the charge-modifiable surface utilized in the embodiment of Fig. 1;

Figure 3:
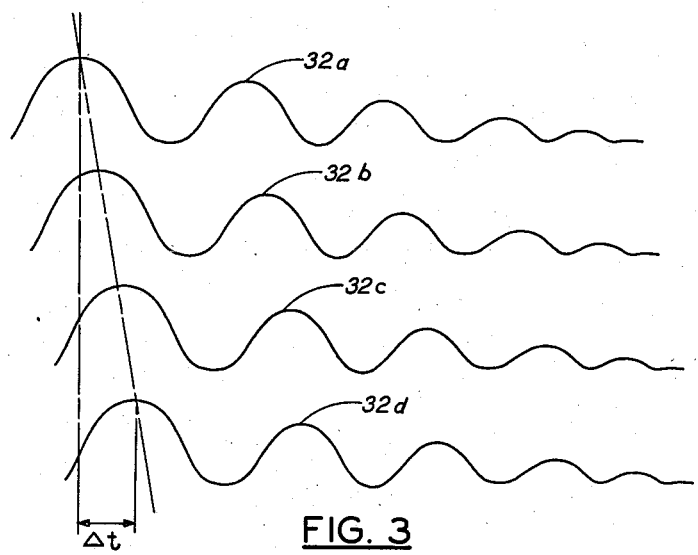
Figs. 3 and 4 are curves illustrating one method of operation of the embodiment of Fig. 1.

In Fig. 1, reference numeral 11 designates a suitable seismic wave detector capable of producing a voltage varying in sympathy with the movement of the earth adjacent the detector. Although, for simplicity, only one detector 11 has been illustrated, it will be apparent that, in practice, a considerable number of such detectors may be employed and these detectors may be arranged in any suitable pattern or configuration. The output from detector 11 is supplied through an amplifier 12 to a reproducible recording medium shown schematically at 13. Recording medium 13 may be of any suitable type on which the different seismic detector signals may be recorded and subsequently reproduced repeatedly and at will. Recording medium 13, for example, may be a magnetic recording medium, such as a magnetic tape or magnetic drum recorder, on which variations in the signals supplied thereto are converted into variations in the magnetization of the recording medium. Recording device 13 may also be of the photographic type, in which variations in the seismic detector signal are converted into variations in the density of a photographic film and in which the recorded signals are reproduced by detecting variations in the intensity of light which is transmitted through the film as the film is moved past a suitable light source.

The output from recording medium 13 may be supplied through a network shown schematically at 14 for performing different operations on the reproduced signal, such as filtering and mixing. The output of device 14 is supplied through an amplifier 15 to suitable means for storing the seismic detector signals on an electrostatic, charge-modifiable surface. The device providing the electrostatic, charge-modifiable surface may be of any suitable type but is preferably of the type designated at 17 in Fig. 1. Device 17 comprises a writing portion 18, in which variations in the seismic detector signals are translated into variations in the charge distribution of the charge-modifiable surface, and a reading portion 19, in which the variations in the charge distribution produced by writing portion 18 are detected and converted into an electrical signal suitable for oscilloscopic display.

The charge-modifiable surface is located between writing portion 18 and reading portion 19 and may be in the form of a target 20. As shown in detail in Fig. 2, target 20 comprises a plate of metal 21 upon which is deposited a film of insulating material 22. The insulating film may be any good insulator, such as aluminum fluoride, silica fluoride or magnesium fluoride, applied to the metal 21 by any suitable means, such as evaporation. A fine mesh screen 23 having a high transmission factor is utilized to provide the mechanical support for the elements 21 and 22. Mesh 23 faces the writing end of tube 17, and the mesh is made fine enough so that it does not limit the resolving power of the tube.

Writing portion 18 is provided with a conventional gun element 18a which emits an electron beam controllable by a grid 18c and deflectable by two pairs of electrostatic deflection plates 18d and 18e. Deflection plates 18e are connected to amplifier 15, and deflection plates 18d are connected to a suitable source 26 of deflection voltage. Source 26 is controlled through a gating network 16 which receives a pulse from amplifier 15 to initiate the sweep cycles. Sweep generator 26 is tied in with recorder 13, as shown by the dotted lines, to insure synchronization of the commencement of the sweep with the start of the repetition period of recorder 13. The beam of electrons emitted from gun 18a is applied to the mesh or writing side of target 20, and the position of the electron beam on the target is controlled by the potentials applied to deflection plates 18d and 18e.

The reading portion 19 of tube 17 is provided with an electron gun 19a for producing a controllable beam of electrons directed at the insulating portion 22 of target 20. The position of the electron beam from gun 19a on insulating layer 22 is controlled by a pair of magnetic deflection yokes 19b and 19c which are energized from a suitable source 25 of horizontal and vertical deflection voltages. Tube 17 is also provided with a collector 24 connected to ground for collecting secondary emission electrons. Target metal 21 is connected through a resistor 27 to a suitable source of power 28. Source 28 also supplies power to cathodes 18a and 19a of tube 17. Prior to operating the tube, the magnitude of the potential supplied by power supply 28 to the target metal 21 is adjusted so that target metal 21 is approximately 50 volts negative with respect to the collector 24. The surface of the insulating layer 22 is charged by secondary emission to approximately the same potential as the collector 24.

The principles of operation of tube 17 are as follows. The reading beam generated by gun 19a has a secondary emission ratio greater than unity, and it scans over the surface of insulating layer 22 to bring the potential of layer 22 to approximately the potential of the collector 24. The insulating layer 22 may be regarded as the dielectric in a capacitor, one of whose plates is the target metal layer 21 and the other plate is the surface scanned by the beam from reading gun 19a. As a starting equilibrium condition, the simulated capacitor is charged up uniformly over its entire area, and since one plate of the capacitor is the insulating surface of the dielectric and consequently does not conduct transversely, it is possible to charge and discharge any part of the capacitor without affecting the rest of the capacitor.

The charge of the dielectric of the simulated capacitor is varied by the phenomenon of conductivity produced by electron bombardment of a thin insulating film. When the electron beam from gun 18a is accelerated with sufficient potential, to approximately 10 kilovolts, insulating layer 22 is rendered conductive at the point of impingement of the writing beam and decreases the electrostatic charge on the surface of the insulating layer at the point of impingement, which charge is different from the charge on the remainder of the surface of layer 22. Deflection of the high-voltage beam of electrons from writing gun 18a across the target in accordance with variations in the seismic detector signals thus results in a modification of the charge distribution on target 20 in accordance with the seismic signal variations.

When the target is scanned by the electron beam from reading gun 19a, the secondary emission ratio is less than unity at the points on the target where the writing beam has struck and rendered the surface negative. Thus, some charge is removed every time the reading beam scans the areas on which the writing beam has impinged. This removal of the charge produces the desired signal through the voltage drop in resistor 27 resulting from the discharge current flow from the target metal to the collector 24. Variations in the voltage across resistor 27 are amplified by an amplifier 36 and supplied to the cathode or gun 37a of an oscilloscopic display device 37. Cathode 37a is energized from power supply 28. Tube 37 is also provided with a pair of magnetic deflection coils 37b and 37c which are energized from deflection means 25 to synchronize the scanning of the electron beam of tube 37 with the scanning of the electron beam of gun 19a. The amplified signal from amplifier 36 thus modulates the intensity of the electron beam of tube 37, and the resulting electron beam is deflected by coils 37b and 37c to present an oscilloscopic display of the seismic detector signals on the phosphorescent surface of tube 37.

The amount of charge removed or deposited by the writing beam in one scan may be made large with respect to the amount of charge which can be restored by the reading beam in one scan. Then many scans of the reading beam will be necessary to restore the original equilibrium conditions, and thus many reproductions of the stored signals may be obtained for one scanning by the writing beam.

In operation of the embodiment of Fig. 1, after recording of the seismic detector signals on recording and reproducing device 13, device 13 is operated to reproduce the seismic detector signals stored thereon. The signals from recorder-reproducer 13 may be reproduced in any desired manner, such as by simultaneously reproducing all of the signals and sequentially and progressively sampling the different signals with electronic switching means to produce a series of pulses, which are applied through amplifier 15 to deflection plates 18e to cause the electron beam to trace out the different signals on the target 20 in the form of curves consisting of pulses separated by distances corresponding to the sampling interval. However, for simplicity, the signals may be sequentially reproduced by device 13 and applied to deflection plates 18e. With a conventional saw-tooth voltage applied to deflection plates 18d, the signals will be sequentially traced out on target 20 by the writing beam at a speed and with a rate of repetition determined by the characteristics of device 13. Suitable means may be provided to synchronize the operation of device 13 and the deflection circuits for the writing beam so that the writing beam is successively deflected down the target as the different signals are reproduced from device 13. After all of the signals have been sequentially traced out on the target by the writing beam, the process may be repeated if it is desired to maintain the stored signals on the target while a considerable number of readings of the target information are obtained.

The rate of scanning of the target by the reading beam is preferably adjusted so as to provide a complete scanning of the insulating surface within the period of persistence of the particular phosphor used in tube 37. Thus, for example, if 10 separate seismic detector signals of 6 seconds' duration each are sequentially written out on the target, the total time required to write these is 60 seconds. If it is desired to display the signals on the cathode ray tube at a rate of 30 scannings per second, corresponding to the scanning rate associated with commercial television tube phosphors, a total of 1800 scannings of the insulating layer by the reading beam are required to each complete writing cycle. Thus, the displayed signals on the face of tube 37 will appear as a steady image even though the seismic signals under study are reproduced by recording medium 13 in a period which is considerably greater than the period of persistence of the phosphor of tube 37.

In scanning the target surface, the reading beam from gun 19a may be deflected in any suitable manner to produce different time sequences of the signals displayed on the tube 37. A representative operation of the embodiment illustrated in Fig. 1 is illustrated in Fig. 3, in which the curves 32a, 32b, 32c and 32d represent plots of seismic detector signals as functions of time, with the different signals displaced vertically from each other. The representation of Fig. 3 is also analogous to the manner in which the different seismic detector signals are written or stored on the charge-modifiable surface of tube 17 by the writing gun, so that the target surface appears to the reading gun substantially as shown in Fig. 3.

Similar events on curves 32a, 32b, 32c and 32d are displaced from each other along the axis of abscissa, representing differences in arrival times at the different detectors of energy from a given reflecting horizon. Such variations in the times of arrival may be caused by moveout associated with the geophone spread, stepout caused by a dipping reflecting horizon, or irregular transmission of the returning seismic energy through the weathered layer of the earth. As an aid in obtaining maximum information for the signals, it is often desirable to present the different seismic detector signals with the intertrace time variations removed so that the signals appear with similar events coincident in time.

Figure 4:
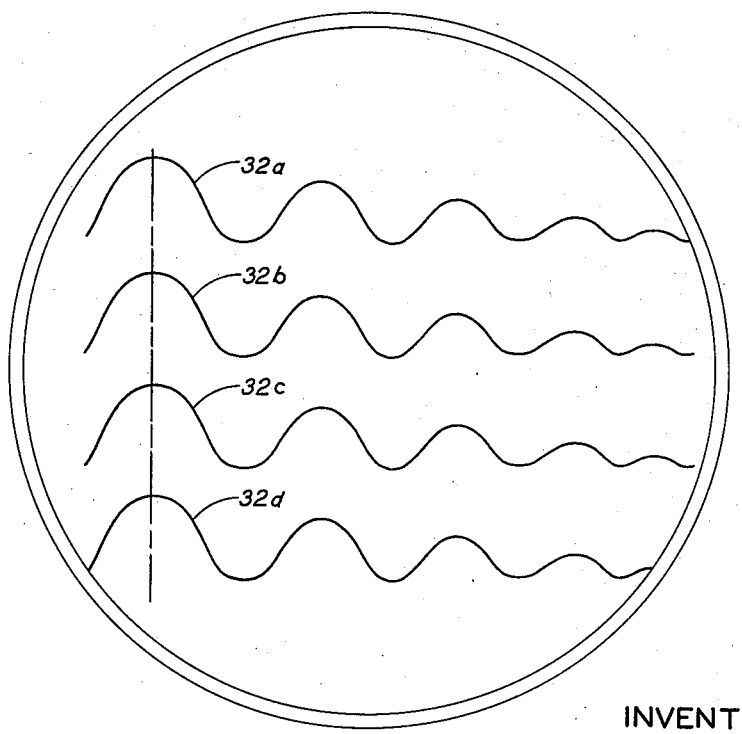

Such a presentation may be obtained with the apparatus of Fig. 1 by generating in a network 31 a current which modifies the deflection current from generator 25 in a suitable manner. From Fig. 3 it will be seen that the first peak in curve 32a is separated from the first peaks of curves 32b, 32c and 32d by progressively increasing periods of time, the difference in time between the first peak of curve 32a and the first peak of curve 32d being indicated by $\Delta t$. By supplying a deflection current component from generator 31 which modifies the horizontal deflection current from generator 25 so as to cause the reading beam to start scanning target 20 at a point which is progressively displaced to the right along the time axis of Fig. 3, as the beam travels over the target from top to bottom, the signals as displayed on tube 37 may be made to appear as shown in Fig. 4, in which each of curves 32b, 32c and 32d has been effectively shifted to the left an amount corresponding to the intertrace time variation between the respective signal and reference signal 32a.

The deflection current generated by network 31 to compensate for the intertrace time variations is applied to the horizontal deflection elements to cause the horizontal scanning to commence at a point which is progressively shifted to the right in Fig. 3 for each line of scanning. For example, network 31 may generate a series of step voltages, each step having a width corresponding to the width represented by the amplitude range of each of the scanned signals, so that the point at which the horizontal scanning commences as the scanning beam moves from top to bottom of the target is progressively shifted to the right in steps corresponding to the desired time corrections among the different signals.

Figure 5:
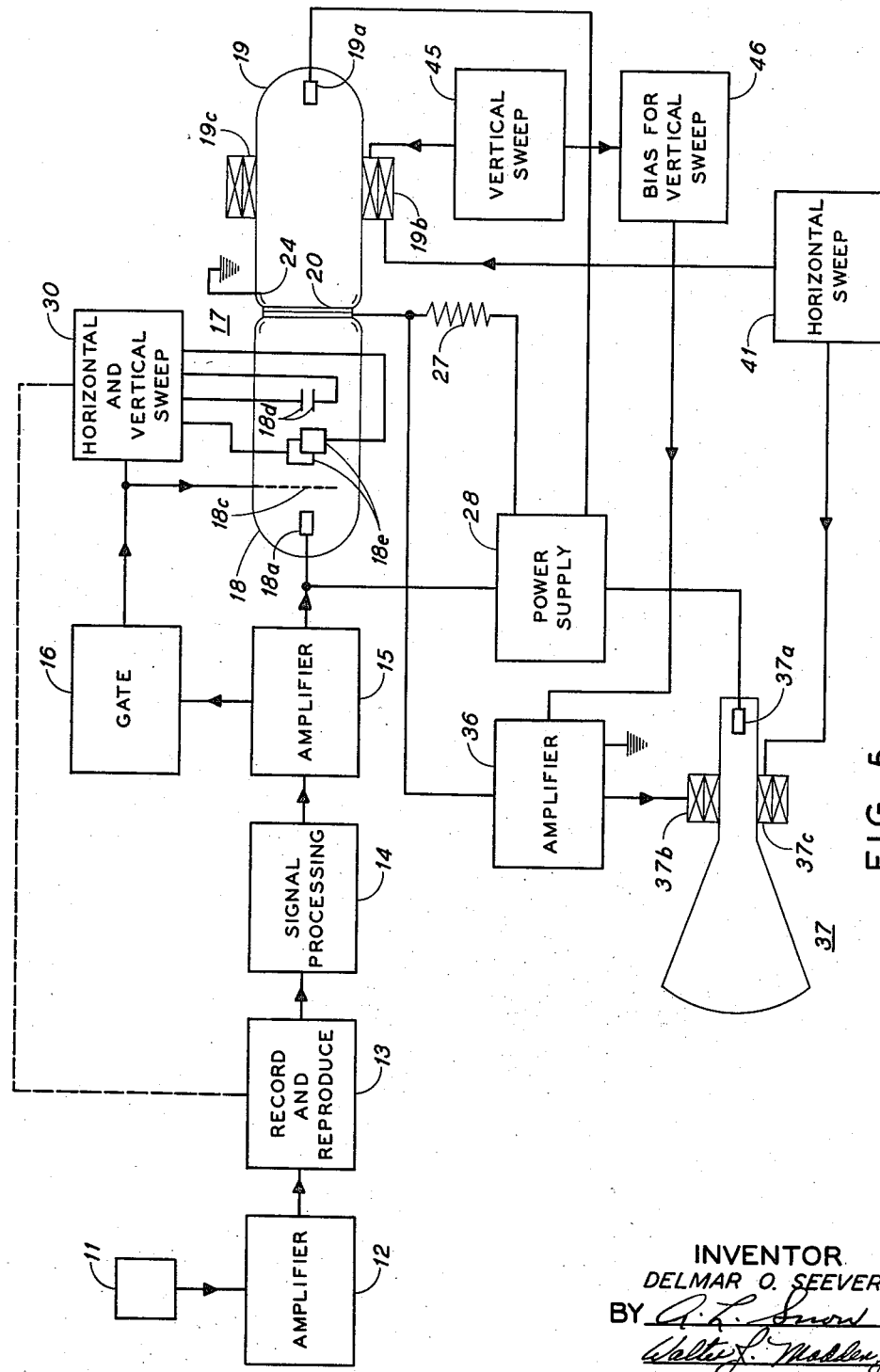
Fig. 5 illustrates an alternate embodiment of the invention in which the intensity of the electron beam producing the charge modification is modulated by the seismic detector signals.

Fig. 5 illustrates an alternate embodiment of the invention, in which the intensity of the writing beam of gun 18a is varied as a function of the amplitude of the seismic signals. In Fig. 5, the output from seismic detector 11 is supplied through amplifier 12 to recording medium 13 and then through signal-processing network 14 to amplifier 15. The output from amplifier 15 is supplied to gun 18a to modulate the intensity of the beam of electrons emitted thereby as a function of the amplitude of the seismic detector signal. Amplifier 15 also supplies an impulse to gating device 16, and the output of gate 16 is utilized to control the potential of grid 18c and to control the initiation of operation of a combined horizontal and vertical sweep generator 30. Generator 30 is tied in to recorder 13, as shown by the dotted line, to insure synchronization of the sweep and the recorder cycle.

The intensity of the writing beam from electron gun 18a is adjusted so that target 20 is operated in the range in which the change in charge distribution effected by the writing beam is proportional to the intensity of the writing beam. The writing beam may therefore be swept uniformly across the target surface to modify the charge distribution thereon as a function of the amplitude of the seismic detector signal which is controlling the intensity of the writing beam. The stored information will thus appear on target 20 as a series of lines, with each line composed of a series of discrete, charge-modified portions, the degree of charge modification of each portion being dependent upon the intensity of the writing beam during the impingement of the writing beam on the particular portion.

The electron beam from reading gun 19a scans target 20 under control by a horizontal sweep generator 41 and a vertical sweep generator 45 and detects the charge modifications produced thereon by writing gun 18a. This detected charge modification is converted, as before, into a signal voltage across resistor 27. The voltage across resistor 27 is amplified by amplifier 36 and supplied to the vertical deflection coil 37b of tube 37 to provide a vertical deflection component having an amplitude which is dependent upon the amplitude of the signal detected by the scanning of the target. Amplifier 36 is also supplied with a vertical bias component from a bias generator 46 which is controlled by vertical sweep 45. Bias generator 46 supplies a bias component which successively deflects the beam of display tube 37 vertically of the display surface so that the successively scanned signals on the target are displayed on tube 37 with vertical displacements therebetween. Horizontal deflection coil 37c of tube 37 is supplied with a sweep voltage from horizontal sweep generator 41.

The frequency with which target 20 is scanned is selected so that at least one complete scanning of the target by the reading beam is accomplished within the period of persistence of vision of the phosphor on the surface of display tube 37. The display on tube 37 is thus of substantially constant intensity regardless of the period of repetition of reproducing device 13.

By suitable design of target 20 and suitable choice of the intensity of the writing beam from gun 18a, the embodiment illustrated in Fig. 5 may be utilized to perform mixing of different seismic detector signals in tube 17. Such operation requires that the intensity of the writing beam be adjusted so that target 20 operates in the region in which the extent of the target charge modification is proportional to the intensity of the writing beam. It will be understood that in order to accurately perform such mixing, the signals should first be compensated for whatever intertrace time variations may be present. Such compensation may be made by shifting the reproducing heads of device 13 different amounts corresponding to the desired corrections, or by any other suitable known means. Such mixing may be accomplished by causing the writing beam from gun 18a to superpose successive traces, corresponding to separate seismic detector signals, upon substantially the same line of target 20, so that the resultant charge modification on target 20 is proportional to the sum of the signals. The resulting mixed signal or signals may then be detected by the reading beam and displayed on the display surface of tube 37.

Although but a few embodiments of the present invention have been illustrated and described, it will be obvious to those skilled in the art that various changes and modifications may be made therein without departing from the spirit of the invention or the scope of the appended claims.

I claim:

1. Apparatus for analyzing a plurality of seismic detector signals having predetermined time relationships therebetween comprising means for generating a first electron beam, an electrostatic, charge-modifiable storage surface, first deflection means for deflecting said first electron beam across said surface in one dimension in response to variations in the amplitude of said signals and deflecting said first electron beam in another dimension across said surface as a function of time to store said signals in said predetermined time relationships on said surface in the form of variations in the charge distribution thereon, means for generating a second electron beam, second deflection means for deflecting said second beam to scan said surface to detect variations in the charge distribution produced by said first electron beam, deflection bias means connected to said second deflection means for varying the point of commencement of said scanning in said time dimension for each of said signals stored on said surface, signal generating means connected to said surface for converting the variations in charge distribution detected by said scanning into an electrical signal, and oscilloscopic display means synchronized with said second deflection means for presenting said electrical signal as a function of time to present said seismic detector signals in time relationship to each other different from said predetermined time relationships.

2. Apparatus for analyzing a plurality of seismic detector signals comprising means for generating a first electron beam, an electrostatic, charge-modifiable storage surface, first deflection means for deflecting said first electron beam across said surface in one dimension in response to variations in the amplitude of said signals and for deflecting said first electron beam in another dimension across said surface as a function of time to store said signals in predetermined time relationship on said surface in the form of variations in the charge distribution thereon, means for generating a second electron beam, second deflection means to deflect said second beam for scanning said surface to detect variations in the charge distribution produced by said first electron beam, adjustable control means for said second deflection means for controlling said scanning of said surface, signal generating means connected to said surface for converting the variation in charge distribution detected by said scanning into an electrical signal, and oscilloscopic display means synchronized with said second deflection means and energized by said electrical signal to display said seismic detector signals in a form for optical analysis in accordance with the adjustment of said control means.

3. An apparatus for analyzing a plurality of seismic detector signals having initial predetermined time relationships therebetween comprising means for generating a first electron beam, an electrostatic, charge-modifiable storage surface, first deflection means for deflecting said first electron beam across said surface in one dimension in response to variations in the amplitude of said signals and for deflecting said first electron beam in another dimension across said surface as a function of time to store said signals in said predetermined time relationships on said surface in the form of variations in the charge distribution thereon, means for generating a second electron beam, second deflection means to deflect said second beam for scanning said surface to detect variations in the charge distribution produced by said first electron beam, adjustable control means for said second deflection means for controlling said scanning of said surface, signal generating means connected to said surface for converting the variations in charge distributions detected by said scanning into an electrical signal, and oscilloscopic display means synchronized with said second deflection means and energized by said electrical signal to present said seismic detector signals in timed relationship to each other different from said initial predetermined time relationships in accordance with the adjustment of said control means.

4. An apparatus for analyzing a plurality of seismic detector signals having initial predetermined time relationships therebetween comprising means for generating a first electron beam, an electrostatic charge-modifiable storage surface, deflection means for deflecting said first electron beam across said surface in one dimension for each of said seismic detector signals as a function of time, means for varying the intensity of said first electron beam in response to variations in the amplitude of said seismic detector signals, means for generating a second electron beam, second deflection means to deflect said second beam for scanning said surface to detect variations in the charge distribution produced by said first electron beam, adjustable control means for said second deflection means for controlling said scanning of said surface, signal generating means connected to said surface for converting the variations in charge distribution detected by said scanning into an electrical signal, and oscilloscopic display means synchronized with said second deflection means for presenting said electrical signal as a function of time to display said seismic detector signals in a form for optical analysis in accordance with the adjustment of said control means.

5. Apparatus for analyzing a plurality of seismic detector signals having initial predetermined time relationships therebetween comprising in combination an electrostatic charge-modifiable storage surface, means for generating a first electron beam and for accelerating said beam toward said surface, means for deflecting said beam in one dimension in accordance with time to provide a plurality of parallel trace positions for said seismic signals, means for controlling the deflection of said beam in said time dimension including means for selectably initiating said beam along said time dimension and means for selectably positioning each of said seismic signals on selected ones of said parallel positions, means for reproducing each of said seismic signals sequentially, and means for modulating the intensity of said beam by each of said sequentially reproduced seismic signals whereby said storage surface is modified in charge in accordance with said selectably positioned signals, means for generating a second electron beam, means for deflecting said second beam to scan said storage surface to detect variations in the charge modification produced by said first electron beam, signal generating means connected to said surface for converting the variations in charge deposition detected by said scanning into an electrical signal, and oscilloscopic display means synchronized with said second deflection means for displaying said electrical signal as a function of time in accordance with said selectable initiation and position of said seismic signals.

References Cited in the file of this patent

UNITED STATES PATENTS

| | | |
|---|---|---|
| 2,378,383 | Arndt | June 19, 1945 |
| 2,524,295 | Mesner | Oct. 3, 1950 |
| 2,570,858 | Rajchman | Oct. 9, 1951 |
| 2,597,683 | Stocker | May 20, 1952 |
| 2,602,921 | Peters et al. | July 8, 1952 |
| 2,612,634 | Mesner | Sept. 30, 1952 |
| 2,628,689 | Rieber | Feb. 17, 1953 |
| 2,658,579 | Rieber | Nov. 10, 1953 |
| 2,759,045 | Young | Aug. 14, 1956 |
| 2,762,862 | Bliss | Sept. 11, 1956 |

FOREIGN PATENTS

| | | |
|---|---|---|
| 696,229 | Great Britain | Aug. 26, 1953 |